(12) United States Patent
Kitagawa et al.

(10) Patent No.: US 11,146,122 B2
(45) Date of Patent: Oct. 12, 2021

(54) COIL UNIT, WIRELESS POWER TRANSMISSION DEVICE, WIRELESS POWER RECEIVING DEVICE, AND WIRELESS POWER TRANSMISSION SYSTEM

(71) Applicant: TDK CORPORATION, Tokyo (JP)

(72) Inventors: Hiroya Kitagawa, Tokyo (JP); Mitsunari Suzuki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 96 days.

(21) Appl. No.: 16/811,417

(22) Filed: Mar. 6, 2020

(65) Prior Publication Data
US 2020/0303966 A1 Sep. 24, 2020

(30) Foreign Application Priority Data

Mar. 19, 2019 (JP) .............................. JP2019-051442

(51) Int. Cl.
| | |
|---|---|
| *H02J 50/70* | (2016.01) |
| *H02J 50/12* | (2016.01) |
| *H02J 50/80* | (2016.01) |
| *H01F 38/14* | (2006.01) |
| *H01F 27/28* | (2006.01) |
| *H02J 7/02* | (2016.01) |
| *H01F 27/36* | (2006.01) |

(52) U.S. Cl.
CPC .............. *H02J 50/70* (2016.02); *H01F 27/28* (2013.01); *H01F 27/36* (2013.01); *H01F 38/14* (2013.01); *H02J 7/02* (2013.01); *H02J 50/12* (2016.02); *H02J 50/80* (2016.02)

(58) Field of Classification Search
None
See application file for complete search history.

(56) References Cited

U.S. PATENT DOCUMENTS

| | | | |
|---|---|---|---|
| 10,707,573 B2* | 7/2020 | Mikawa | ................... H01Q 7/00 |
| 2017/0063155 A1 | 3/2017 | Nishikawa et al. | |
| 2018/0082782 A1 | 3/2018 | Naruse et al. | |
| 2018/0091111 A1* | 3/2018 | Wennerstrom | ....... H03H 7/0115 |

(Continued)

FOREIGN PATENT DOCUMENTS

| | | |
|---|---|---|
| JP | 2014-072968 A | 4/2014 |
| JP | 2014-110726 A | 6/2014 |

(Continued)

*Primary Examiner* — Lincoln D Donovan
*Assistant Examiner* — Khareem E Almo
(74) *Attorney, Agent, or Firm* — Oliff PLC

(57) ABSTRACT

A coil unit including: a magnetic body including a first and second main face facing the first main face; a first coil made of a first conductor winding spirally around a first axis; and a second coil made of a second conductor winding spirally around a second axis, wherein the first coil has a first coil face intersecting the first axis and is disposed wherein the first coil face faces the first main face, the second coil has a second coil face intersecting the second axis and is disposed so the second coil face faces the second main face, the first coil face has a first opening, the second coil face has second opening, part of an inner edge of the second opening is separated from the magnetic body, and the second coil generates a magnetic field in the opposite direction of a magnetic field generated by the first coil.

19 Claims, 8 Drawing Sheets

(56) References Cited

U.S. PATENT DOCUMENTS

| | | | | |
|---|---|---|---|---|
| 2018/0294089 A1* | 10/2018 | Leong | ............... | H01F 19/00 |
| 2019/0341692 A1* | 11/2019 | Kubo | ............... | H02J 50/80 |
| 2019/0385787 A1* | 12/2019 | Ichikawa | ............ | H01Q 7/00 |
| 2020/0303966 A1* | 9/2020 | Kitagawa | ........... | H02J 50/005 |

FOREIGN PATENT DOCUMENTS

| | | |
|---|---|---|
| JP | 2015-015852 A | 1/2015 |
| JP | 2017-046423 A | 3/2017 |
| WO | 2016/162964 A1 | 10/2016 |

\* cited by examiner

COIL UNIT, WIRELESS POWER TRANSMISSION DEVICE, WIRELESS POWER RECEIVING DEVICE, AND WIRELESS POWER TRANSMISSION SYSTEM

BACKGROUND OF THE INVENTION

Field of the Invention

The present invention relates to a coil unit, a wireless power transmission device, a wireless power receiving device, and a wireless power transmission system.

Priority is claimed on Japanese Patent Application No. 2019-051442, filed Mar. 19, 2019, the content of which is incorporated herein by reference.

Description of Related Art

Technologies relating to wireless power transmission systems have been researched and developed. A wireless power transmission system performs wireless power transmission through a magnetic field between a wireless power transmission device including a power transmission coil and a wireless power receiving device including a power receiving coil. In the description here, wireless power transmission means wireless transmission of electric power.

In wireless power transmission through a magnetic field using a wireless power transmission system, a leakage flux occurs. A leakage flux is a magnetic flux that does not contribute to wireless power transmission performed through a magnetic field between a power transmission coil and a power receiving coil. When a leakage flux increases, the influence of the leakage flux on electronic devices disposed in the vicinity of a wireless power transmission system increases. Thus, there are cases in which a technology for decreasing a leakage flux using a cancellation coil is used in wireless power transmission. Here, the cancellation coil is a coil that generates a magnetic field in a direction opposite to a direction of a magnetic field generated by a power transmission coil or a power receiving coil. For example, a cancellation coil included in a wireless power transmission device generates a magnetic field in a direction opposite to a direction of a magnetic field generated by a power transmission coil. In accordance with this, the cancellation coil can decrease a leakage flux generated in accordance with a magnetic field generated by the power transmission coil. In addition, for example, a cancellation coil included in the wireless power receiving device generates a magnetic field in a direction opposite to a direction of a magnetic field generated by the power receiving coil. In accordance with this, the cancellation coil can decrease a leakage flux generated in accordance with a magnetic field generated by the power receiving coil.

In regards to this, a coil antenna including a cancellation coil disposed on the same axis as that of a transmission coil is known (see Patent Document 1). Here, the transmission coil is a coil that performs transmission of electric power in wireless power transmission and collectively refers to a power transmission coil and a power receiving coil.

Patent Documents

[Patent Document 1] Japanese Unexamined Patent Application, First Publication No. 2015-015852

SUMMARY OF THE INVENTION

However, in such a coil antenna, while a leakage flux decreases, a magnetic flux contributing to wireless power transmission is decreased as well. As a result, in the coil antenna, there are cases in which the transmission efficiency of electric power using wireless power transmission decreases.

The present invention is in view of such situations, and an object thereof is to provide a coil unit, a wireless power transmission device, a wireless power receiving device, and a wireless power transmission system capable of inhibiting a decrease in the transmission efficiency of electric power through wireless power transmission while decreasing leakage flux.

One aspect of the present invention is a coil unit including: a magnetic body that includes a first main face and a second main face facing the first main face; a first coil made of a first conductor winding spirally around a first axis; and a second coil made of a second conductor winding spirally around a second axis once or more, wherein the first coil has a first coil face intersecting the first axis and is disposed such that the first coil face faces the first main face, wherein the second coil has a second coil face intersecting the second axis and is disposed such that the second coil face faces the second main face, wherein the first coil face has a first opening, wherein the second coil face has second opening, wherein at least a part of an inner edge of the second opening is separated from the magnetic body, and wherein the second coil is configured to generate a magnetic field in a direction opposite to a direction of a magnetic field generated by the first coil.

According to the present invention, a decrease in the transmission efficiency of electric power using wireless power transmission can be inhibited while a leakage flux is decreased.

DETAILED DESCRIPTION OF THE INVENTION

Embodiment

Hereinafter, embodiments of the present invention will be described with reference to the drawings. In description here, a coil represents a conductor which is winding spirally around at least one of a certain area and a certain object and does not include a conductor as a lead wire connected from the conductor to another circuit. In addition, in description here, the conductor winded as a coil may be an insulation-coated conductor, a Litz wire, or the like.

<Configuration of Wireless Power Transmission System>

Figure 1:
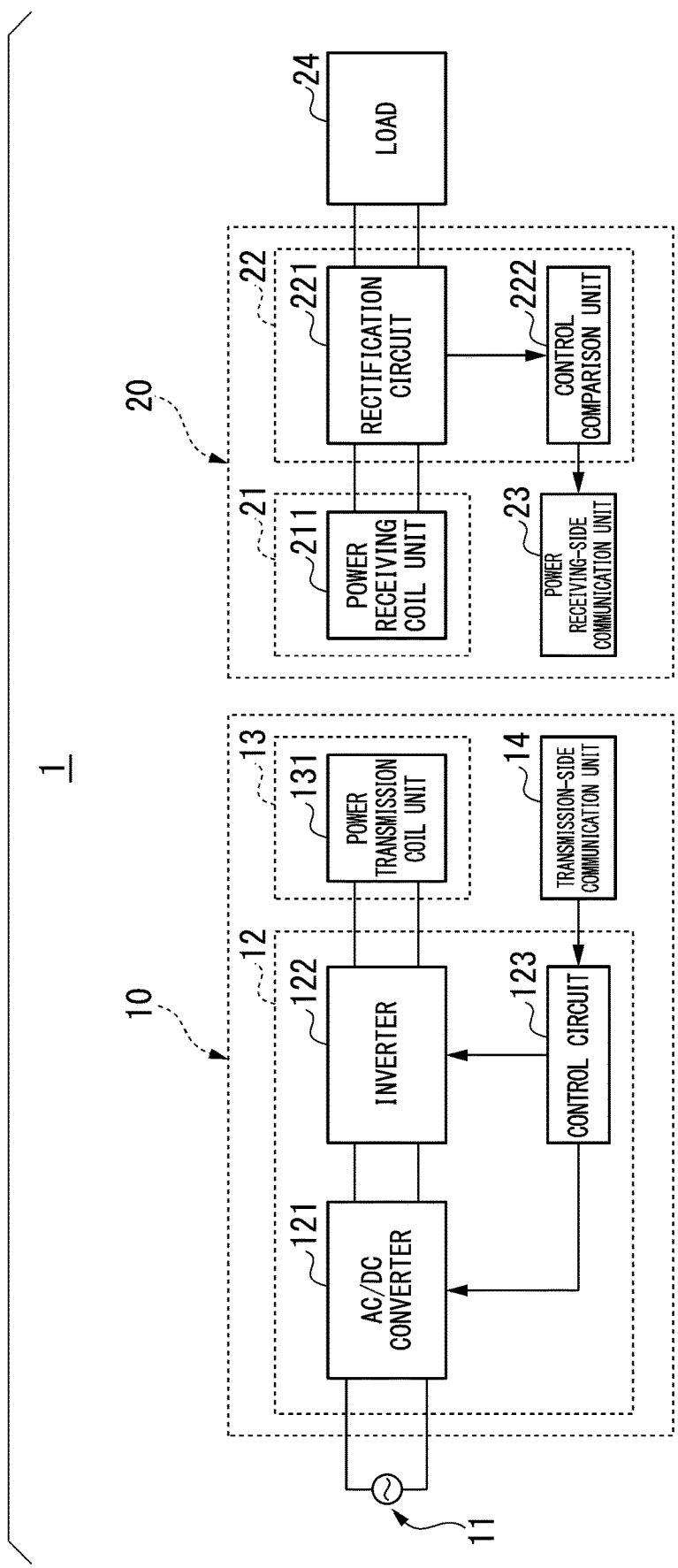
FIG. 1 is a diagram illustrating one example of the configuration of a wireless power transmission system 1 according to an embodiment.

The configuration of a wireless power transmission system 1 according to an embodiment will be described. FIG. 1 is a diagram illustrating one example of the configuration of the wireless power transmission system 1 according to an embodiment.

The wireless power transmission system 1 includes a wireless power transmission device 10 and a wireless power receiving device 20. In the wireless power transmission system 1, electric power is transmitted from the wireless power transmission device 10 to the wireless power receiving device 20 through wireless power transmission.

The wireless power transmission device 10 is connected to an AC power supply 11 that supplies an AC voltage. The wireless power transmission device 10 transmits electric power to the wireless power receiving device 20 through wireless power transmission based on an AC voltage supplied from the AC power supply 11.

The AC power supply 11 may be any power supply as long as the power supply supplies an AC voltage and, for example, is a commercial power supply, a switching power supply, or the like. The switching power supply is a switching converter or the like. The AC power supply 11 supplies an AC voltage to the wireless power transmission device 10.

The wireless power transmission device 10, for example, includes a power transmission circuit 12, a power transmission coil part 13, and a power transmission-side communication unit 14. In addition, the wireless power transmission device 10 may be configured to include other circuits in addition to the power transmission circuit 12, the power transmission coil part 13, and the power transmission-side communication unit 14.

The power transmission circuit 12 converts an AC voltage supplied from the AC power supply 11 into an AC voltage having a driving frequency. The power transmission circuit 12, for example, includes an AC (Alternating Current)/DC (Direct Current) converter 121, an inverter 122, and a control circuit 123. The power transmission circuit 12 may be configured to include another circuit that converts an AC voltage supplied from the AC power supply 11 into an AC voltage having the driving frequency instead of the configuration including the AC/DC converter 121 and the inverter 122. In addition, the power transmission circuit 12 may be configured to include other circuits in addition to the AC/DC converter 121, the inverter 122, and the control circuit 123.

The AC/DC converter 121 converts an AC voltage supplied from the AC power supply 11 into a DC voltage of a magnitude according to control performed by the control circuit 123. The AC/DC converter 121 supplies the DC voltage after conversion to the inverter 122. The AC/DC converter 121, for example, may be configured from a combination of a PFC circuit (a power factor improvement circuit) and a DC/DC converter, a combination of a rectification circuit and a DC/DC converter, or any other circuit.

The inverter 122, for example, is a switching circuit (a full bridge circuit, a half bridge circuit, or the like) in which switching devices are bridge-connected. The inverter 122 converts a DC voltage supplied from the AC/DC converter 121 into an AC voltage having a driving frequency. The inverter 122 supplies the AC voltage after conversion to the power transmission coil part 13.

The control circuit 123 controls a DC voltage that is supplied from the AC/DC converter 121 to the inverter 122. The control circuit 123 may be configured to control the driving frequency of the inverter 122, configured to control a duty ratio of the inverter 122, or configured to control the duty ratio together with controlling the driving frequency instead of the configuration for controlling the DC voltage.

In addition, the control circuit 123 acquires a control signal received by the power transmission-side communication unit 14, from the wireless power receiving device 20. For the wireless power receiving device 20 is described later. This control signal is a signal relating to control of a DC voltage supplied from the AC/DC converter 121 to the inverter 122. The control circuit 123 controls the DC voltage in accordance with the acquired control signal and changes the magnitude of the DC voltage as is necessary.

The power transmission coil part 13, for example, includes a power transmission coil unit 131. The power transmission coil part 13 may be configured to include other circuits in addition to the power transmission coil unit 131.

The power transmission coil unit 131 includes a coil functioning as an antenna used for wireless power transmission as a power transmission coil L1 not illustrated in FIG. 1. The power transmission coil unit 131 transmits electric power to the wireless power receiving device 20 through wireless power transmission via the power transmission coil L1.

The power transmission-side communication unit 14, for example, is a communication circuit (or a communication device) that performs wireless communication according to a communication standard such as Wi-Fi (a registered trademark). The power transmission-side communication unit 14, for example, outputs a control signal received from the wireless power receiving device 20 to the control circuit 123.

The wireless power receiving device 20 is connectable to a load 24. In the example illustrated in FIG. 1, the wireless power receiving device 20 is connected to the load 24. The wireless power receiving device 20 includes a power receiving coil part 21, a power receiving circuit 22, and a power receiving-side communication unit 23. In addition, the wireless power receiving device 20 may be configured to include the load 24.

The power receiving coil part 21, for example, includes a power receiving coil unit 211. The power receiving coil part 21 may be configured to include other circuits in addition to the power receiving coil unit 211.

The power receiving coil unit 211 includes a coil functioning as an antenna for wireless power transmission as a power receiving coil L2 not illustrated in FIG. 1. The power receiving coil unit 211 receives electric power from the wireless power transmission device 10 through wireless power transmission via the power receiving coil L2.

The power receiving circuit 22, for example, includes a rectification circuit 221 and a control comparison unit 222. The power receiving circuit 22 may be configured to include other circuits in addition to the rectification circuit 221 and the control comparison unit 222.

The rectification circuit 221 is connected to the power receiving coil unit 211. The rectification circuit 221 converts an AC voltage received by the power receiving coil unit 211 via the power receiving coil L2 into a DC voltage. The rectification circuit 221 supplies the converted DC voltage to the load 24. The rectification circuit 221 is a converter and, for example, is composed of a bridge diode not illustrated in the drawing and a smoothing capacitor not illustrated in the drawing. The rectification circuit 221, for example, performs full-wave rectification of an AC voltage received by the power receiving coil unit 211 and smooths the full-wave rectified voltage using the smoothing capacitor. The rectification circuit 221 supplies a DC voltage after the rectification to the load 24.

The control comparison unit 222 detects a DC voltage supplied from the rectification circuit 221 to the load 24. The control comparison unit 222 compares the detected DC voltage with a reference voltage (a target voltage) and generates a control signal based on a difference between the DC voltage and the reference voltage. The control comparison unit 222 transmits the generated control signal to the wireless power transmission device 10 through the power receiving-side communication unit 23. In other words, in the wireless power transmission device 10, the control circuit 123 controls a DC voltage output to the inverter 122 by the AC/DC converter 121, such that a difference represented by the control signal acquired through the power transmission-side communication unit 14 becomes small. In addition, the control comparison unit 222 may be configured to detect a current supplied from the rectification circuit 221 to the load 24 or may be configured to detect electric power supplied from the rectification circuit 221 to the load 24.

The power receiving-side communication unit 23, for example, is a communication circuit (or a communication device) that performs wireless communication according to a communication standard such as Wi-Fi (a registered trademark). The power receiving-side communication unit 23, for example, transmits a control signal acquired from the control comparison unit 222 to the wireless power transmission device 10.

The load 24 is supplied a DC voltage from the rectification circuit 221. The load 24, for example, is a rechargeable secondary battery (for example, a lithium ion battery, a lithium polymer battery, or the like). In addition, the load 24 may be another device that performs an operation according to a DC voltage instead of the secondary battery.

Furthermore, a conversion circuit (for example, a DC/DC converter, a DC/AC inverter, or the like) that converts an output of the rectification circuit 221 may be configured to be included between the rectification circuit 221 and the load 24.

Here, in this embodiment, the configuration of the power transmission coil unit 131 may be the same as the configuration of the power receiving coil unit 211 or may be a configuration different from the configuration of the power receiving coil unit 211. Hereinafter, as one example, a case in which the configuration of the power transmission coil unit 131 is the same as the configuration of the power receiving coil unit 211 will be described. In other words, hereinafter, as one example, a case in which the configuration of the power transmission coil L1 and the configuration of the power receiving coil L2 are the same will be described. For this reason, hereinafter, for the convenience of description, unless the power transmission coil unit 131 and the power receiving coil unit 211 need to be differentiated from each other, they will be collectively referred to as a coil unit CU in the description. In addition, hereinafter, for the convenience of description, unless the power transmission coil L1 and the power receiving coil L2 need to be differentiated from each other, they will be collectively referred to as a transmission coil L.

According to the configuration as described above, in the wireless power transmission system 1, electric power is transmitted from the wireless power transmission device 10 to the wireless power receiving device 20. Here, a leakage flux is generated in wireless power transmission through a magnetic field in the wireless power transmission system 1. The leakage flux is an unnecessary magnetic flux that does not contribute to wireless power transmission performed through a magnetic field between the power transmission coil L1 and the power receiving coil L2. When a leakage flux increases, the influence of the leakage flux on electronic devices disposed in the vicinity of the wireless power transmission system 1 increases.

Thus, in the wireless power transmission system 1, the coil unit CU includes a cancellation coil CL not illustrated in FIG. 1 together with the transmission coil L. When energized, the cancellation coil CL is a coil that generates a magnetic field in a direction opposite to a direction of a magnetic field generated by the transmission coil L. By including the cancellation coil CL together with the transmission coil L in the coil unit CU, the coil unit CU can decrease a leakage flux generated in accordance with a magnetic field generated by the transmission coil L.

However, in a case in which the coil unit CU includes the cancellation coil CL, there are cases in which the coil unit CU decreases a magnetic flux contributing to wireless power transmission performed through a magnetic field between the power transmission coil L1 and the power receiving coil L2 as well depending on the configurations of the coil unit CU and the cancellation coil CL.

In order to solve such a problem, the coil unit CU and the cancellation coil CL in the wireless power transmission system 1 have configurations capable of inhibiting a decrease in the transmission efficiency of electric power through wireless power transmission while decreasing a leakage flux. Hereinafter, the configurations of the coil unit CU and the cancellation coil CL will be described in detail.

<Configurations of Coil Unit and Cancellation Coil>

Hereinafter, the configurations of the coil unit CU and the cancellation coil CL will be described.

Figure 2:
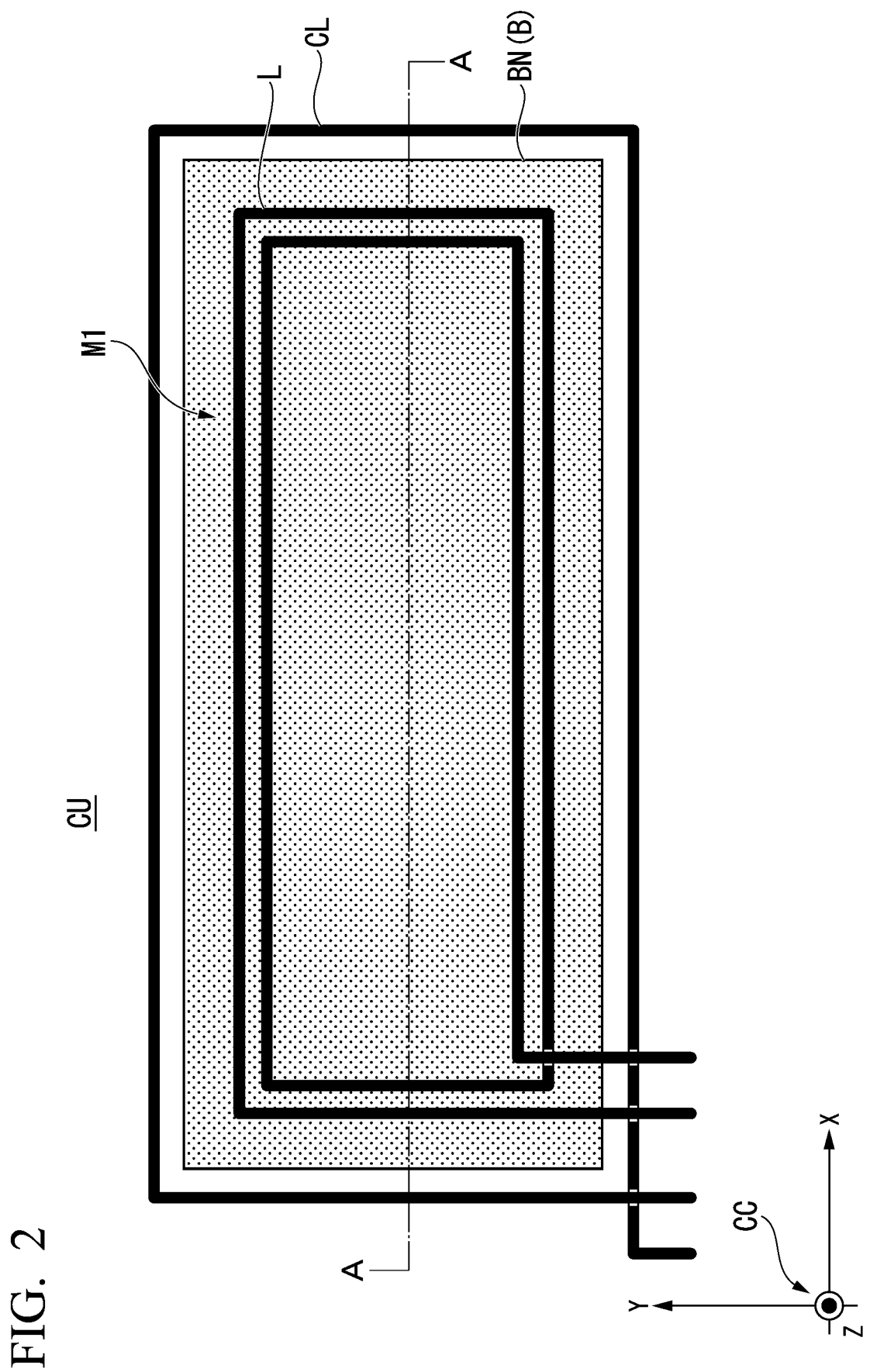
FIG. 2 is a top view illustrating one example of the configuration of a coil unit CU.
Figure 3:
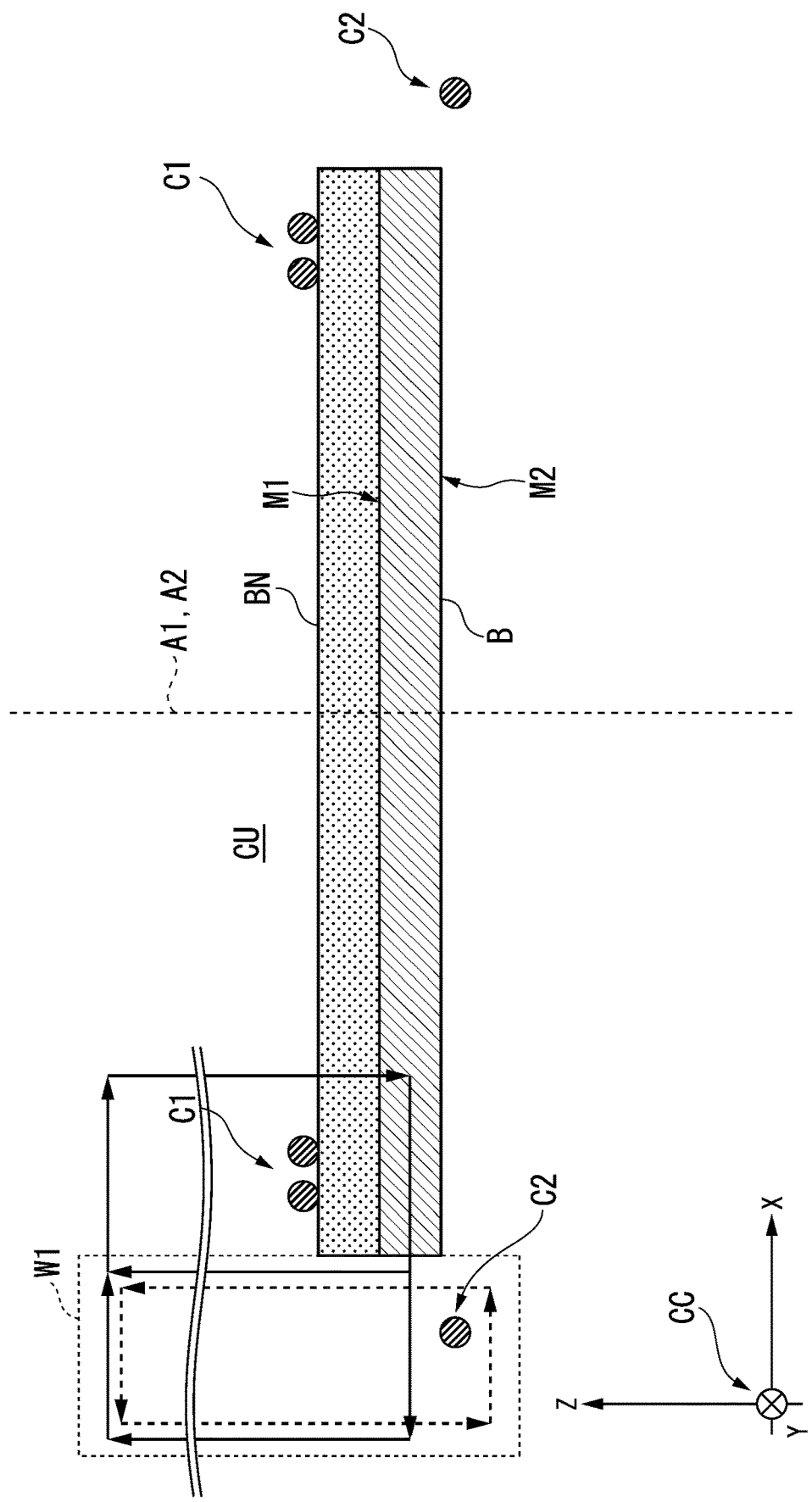
FIG. 3 is a cross-sectional view of the coil unit CU in a case in which the coil unit CU illustrated in FIG. 2 is cut along a cutting section A illustrated in FIG. 2.

FIG. 2 is a top view illustrating one example of the configuration of the coil unit CU. FIG. 3 is a cross-sectional view of the coil unit CU in a case in which the coil unit CU illustrated in FIG. 2 is cut along a cutting section A illustrated in FIG. 2. A three-dimensional orthogonal coordinate system CC illustrated in FIGS. 2 and 3 represents directions in FIGS. 2 and 3. Hereinafter, for the convenience of description, an X axis in the three-dimensional orthogonal coordinate system CC will be simply referred to an X axis, a Y axis in the three-dimensional orthogonal coordinate system will be simply referred to as a Y axis, and a Z axis in the three-dimensional coordinate system will be simply referred to as a Z axis.

In FIGS. 2 and 3, in a case in which the coil unit CU is the power transmission coil unit 131, a positive-direction side of the Z axis from the coil unit CU is a side on which the wireless power transmission device 10 including the coil unit CU faces the wireless power receiving device 20, in other words, a side on which the wireless power receiving device 20 receives electric power. In addition, in FIGS. 2 and 3, in a case in which the coil unit CU is the power receiving coil unit 211, a positive-direction side of the Z axis from the coil unit CU is a side on which the wireless power receiving device 20 including the coil unit CU faces the wireless power transmission device 10, in other words, a side on which the wireless power transmission device 10 transmits electric power.

As illustrated in FIGS. 2 and 3, the coil unit CU includes a magnetic body B, a bobbin BN, a transmission coil L, and a cancellation coil CL. The coil unit CU may be configured not to include the bobbin BN. In addition, the coil unit CU may be configured to include a capacitor configuring a resonance circuit, an electromagnetic shield (for example, an aluminum plate or the like), a magnetic body (a magnetic body other than the magnetic body B) strengthening magnetic coupling between the transmission coils L (in other words, magnetic coupling between the power transmission coil L1 and the power receiving coil L2), and the like in addition to the magnetic body B, the transmission coil L, and the cancellation coil CL. Hereinafter, for the convenience of description, a conductor winded as the transmission coil L (in other words, a conductor configuring the transmission coil L) will be referred to as a first conductor, and a conductor winded as the cancellation coil CL (in other words, a conductor configuring the cancellation coil CL) will be referred to as a second conductor.

The magnetic body B is a magnetic body having two main faces including a first main face M1 and a second main face M2 facing the first main face M1. Hereinafter, as one example, a case in which a shape of the magnetic body B is a rectangular parallelepiped shape will be described. In this case, the first main face M1 and the second main face M2 are flat faces having a rectangular shape that face each other. In addition, the shape of the magnetic body B may be any other shape such as a disc shape instead of the parallelepiped shape as long as the shape is a shape having both the first main face M1 and the second main face M2.

In the example illustrated in FIGS. 2 and 3, the first main face M1 is a face on the positive-direction side of the Z axis among faces included in the coil unit CU. In this example, the first main face M1 is a flat face orthogonal to the Z axis. In addition, a part or the whole of the first main face M1 may be a curved face instead of the flat face.

In the example illustrated in FIG. 3, the second main face M2 is a face on the negative-direction side of the Z axis among faces included in the coil unit CU. In this example, the second main face M2 is a flat face orthogonal to the Z axis. In other words, in this example, the second main face M2 is a face that is parallel to the first main face M1. In addition, a part or the whole of the second main face M2 may be a curved face instead of the flat face.

The transmission coil L is the first conductor which is winding spirally around a first axis A1 (in other words, a spiral-type coil). That is, the transmission coil L made of the first conductor winding spirally around a first axis A1. Here, this coil may be referred to as a spiral coil, a planar coil, or the like. The first axis A1 is a virtual axis. In addition, the first axis A1 is an axis that is parallel to the Z axis. In other words, the first axis A1 is an axis that is orthogonal to the first main face M1. A position at which the first main face M1 and the first axis A1 intersect may be any position as long as the position is a position at which the first conductor can be winded on the first main face M1 as a transmission coil L. In the example illustrated in FIG. 3, a position at which the first main face M1 and the first axis A1 intersect is a position of a centroid of the magnetic body B in a case in which the magnetic body B is seen in the axial direction of the Z axis.

In addition, the transmission coil L has an opening. For this reason, the transmission coil L includes a first conductor winded as the transmission coil L and a transmission coil face including the opening included in the transmission coil L. The transmission coil face is a face that intersects with the first axis A1.

In addition, the transmission coil L is disposed relatively to the magnetic body B such that the transmission coil face faces the first main face M1. That is, the transmission coil L is disposed such that the transmission coil face faces the first main face M1. In the example illustrated in FIGS. 2 and 3, the transmission coil L is disposed relatively to the magnetic body B such that the transmission coil face faces the first main face M1 through the bobbin BN. That is, in the example illustrated in FIGS. 2 and 3, the transmission coil L is disposed such that the transmission coil face faces the first main face M1 through the bobbin BN. The bobbin BN is a jig that fixes the first conductor when the first conductor is winded as the transmission coil L. In FIGS. 2 and 3, for simplification of the drawings, the bobbin BN is represented as an object having a shape similar to the shape of the magnetic body B. In addition, a part or the whole of the transmission coil L may be configured to be brought into contact with or be separate from the first main face M1.

In addition, in a case in which the transmission coil L and the magnetic body B are seen in the axial direction of the first axis A1, the outline of the transmission coil L is included inside the outline of the magnetic body B.

On the other hand, the cancellation coil CL is the second conductor which is winding spirally around the second axis A2 once or more (in other words, a spiral-type coil). That is, the cancellation coil CL made of the second conductor winding spirally around the second axis A2 once or more. Here, this coil may be referred to as a spiral coil, a planar coil, or the like. The second axis A2 is a virtual axis. In addition, the second axis A2 is an axis that is parallel to the Z axis. In other words, the second axis A2 is an axis that is orthogonal to the second main face M2. A position at which the second main face M2 and the second axis A2 intersect may be any position as long as the position is a position at which the second conductor can be winded on the second main face M2 as a cancellation coil CL. In the example illustrated in FIG. 3, a position at which the second main face M2 and the second axis A2 intersect is a position of a centroid of the magnetic body B in a case in which the magnetic body B is seen in the axial direction of the Z axis. In other words, in this example, the second axis A2 is an axis that coincides with the first axis A1. However, the second axis A2 may be an axis that does not coincide with the first axis A1.

In addition, the cancellation coil CL has an opening. For this reason, the cancellation coil CL includes the second conductor winded as the cancellation coil CL and a cancellation coil face including the opening included in the cancellation coil CL. The cancellation coil face is a face that intersects with the second axis A2.

In addition, the cancellation coil CL is disposed relatively to the magnetic body B such that the cancellation coil face faces the second main face M2. That is, the cancellation coil CL is disposed such that the cancellation coil face faces the second main face M2.

In addition, in the cancellation coil CL, at least a part of an inner edge of the opening included in the cancellation coil face is separate from the magnetic body B. In the example illustrated in FIG. 3, in a case in which the coil unit CU is seen in the axial direction of the second axis A2, the whole inner edge of the opening included in the cancellation coil face is separate from the magnetic body B without overlapping the magnetic body B. In addition, instead of being configured to be separate from the magnetic body B in this case, at least a part of the opening included in the cancellation coil face may be configured to be separate from the magnetic body B in a case in which the coil unit CU is seen in a direction orthogonal to the axial direction of the second axis A2 (for example, an axial direction of the X axis). In such a case, for example, in a case in which the coil unit CU is seen in the axial direction of the second axis A2, the coil unit CU may be configured such that the whole outline of the inner edge of the opening included in the cancellation coil face overlaps the outline of the magnetic body B or may be configured such that a part of the outline of the inner edge of the opening included in the cancellation coil face overlaps the outline of the magnetic body, and the remaining part of the outline is separate from the magnetic body B without overlapping the magnetic body B.

In this way, since at least a part of the inner edge of the opening included in the cancellation coil face is separate from the magnetic body B, in the coil unit CU, some of magnetic fluxes generated by the cancellation coil CL offset some of magnetic fluxes that become leakage fluxes among magnetic fluxes generated by the transmission coil L. In the example illustrated in FIG. 3, some of magnetic fluxes generated by the cancellation coil CL, for example, pass through a path along arrows of dotted lines. On the other hand, in this example, some of magnetic fluxes generated by the transmission coil L, for example, pass through a path along arrows of solid lines illustrated in FIG. 3. In this case, inside a frame W1 of dotted lines illustrated in FIG. 3, a magnetic flux passing through a path represented by arrows of dotted lines toward a negative direction of the X axis and a magnetic flux passing through a path represented by arrows of solid lines toward a positive direction of the X axis offset each other. In addition, in this case, inside the frame W1 of dotted lines illustrated in FIG. 3, a magnetic flux passing through a path represented by arrows of solid lines toward the positive direction of the Z axis and a magnetic flux passing through a path represented by arrows of dotted lines toward the negative direction of the Z axis offset each other. In this way, some of magnetic fluxes generated by the cancellation coil CL and some of magnetic fluxes among magnetic fluxes generated by the transmission coil L that become leakage fluxes offset each other. Here, magnetic fluxes on the outer side of the outer frame of the magnetic body B in a case in which the magnetic body B is seen in the axial direction of the first axis A1 among magnetic fluxes generated by the transmission coil L behave as leakage fluxes as the magnetic fluxes are separate far from the first axis A1. In other words, the coil unit CU can offset some of such magnetic fluxes using magnetic fluxes generated by the cancellation coil CL. In other words, the coil unit CU can decrease leakage fluxes.

In addition, a magnetic flux density of magnetic fluxes generated by the cancellation coil CL becomes higher as the magnetic fluxes are closer to the second conductor winded as the cancellation coil CL. In a case in which the coil unit CU is seen in the axial direction of the first axis A1, the second conductor is positioned outside the outline of the first conductor in a part of the second conductor not overlapping the magnetic body B. For these, in the part of the second conductor not overlapping the magnetic body B, magnetic fluxes generated by the cancellation coil CL hardly pass through a path going through the opening of the transmission coil L. In addition, for example, inside the frame W1, a magnetic flux passing through a path represented by arrows of solid lines toward the positive direction of the X axis and a magnetic flux passing through a path represented by arrows of dotted lines toward the positive direction of the X axis do not offset each other. As a result, the coil unit CU hardly eliminates magnetic fluxes contributing to wireless power transmission among the magnetic fluxes generated by the transmission coil L. In other words, the coil unit CU can inhibit a decrease in the transmission efficiency of electric power through wireless power transmission while including the cancellation coil CL.

To sum up, for such reasons, the coil unit CU can inhibit a decrease in the transmission efficiency of electric power through wireless power transmission while decreasing leakage fluxes.

Figure 4:
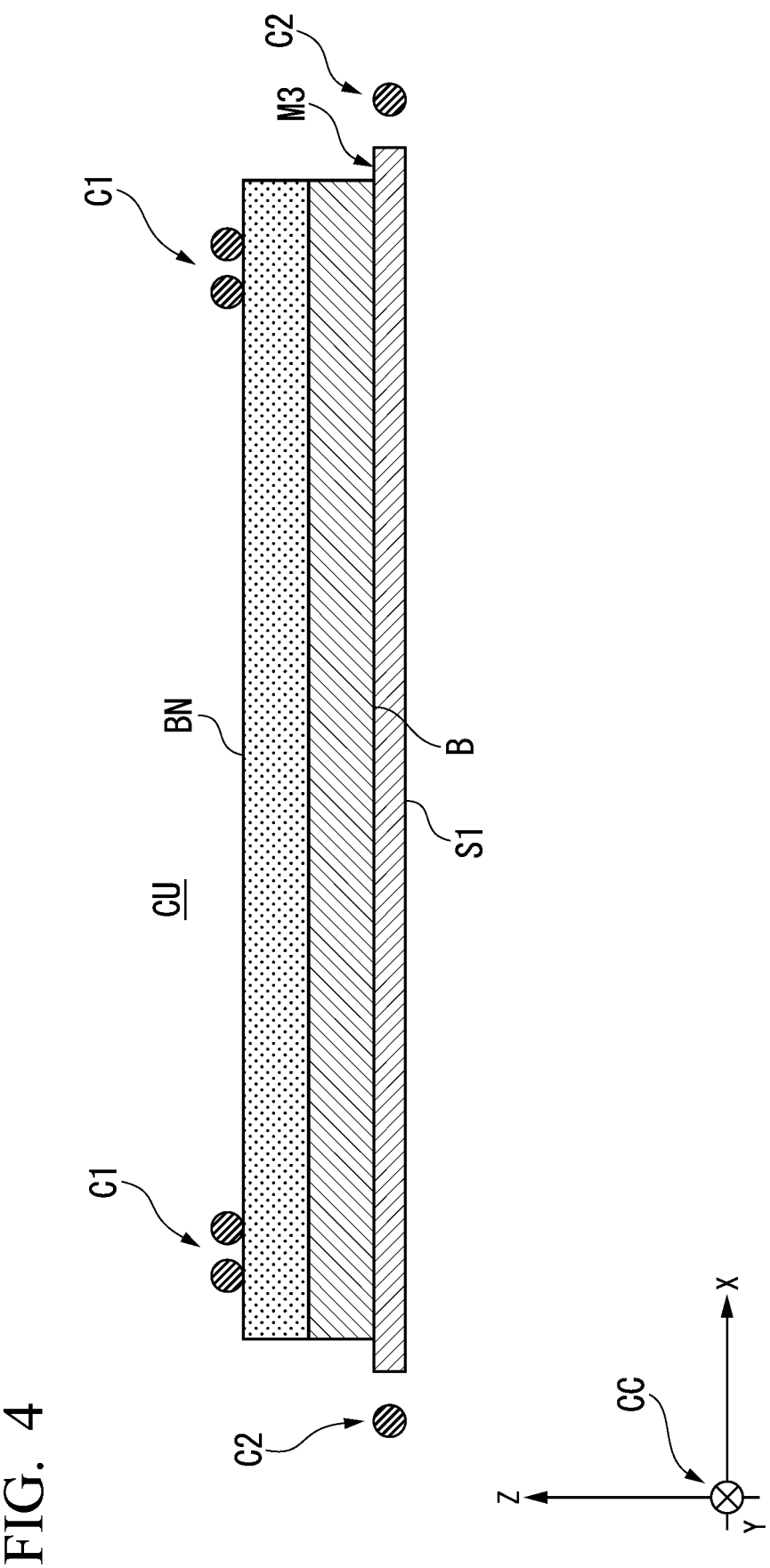
FIG. 4 is a diagram illustrating one example of the configuration of a coil unit CU including a first electromagnetic shield S1.

In addition, the coil unit CU, as illustrated in FIG. 4, may be configured to include a first electromagnetic shield S1. FIG. 4 is a diagram illustrating one example of the configuration of a coil unit CU including the first electromagnetic shield S1.

The first electromagnetic shield S1 is a member that shields electromagnetism. The first electromagnetic shield S1, for example, is formed of aluminum. In addition, the first electromagnetic shield S1 may be formed of another material that can shield electromagnetism instead of aluminum.

The first electromagnetic shield S1, as illustrated in FIG. 4, includes a third main face M3. In the example illustrated in FIG. 4, the third main face M3 is a face that is parallel to the second main face M2. In addition, the first electromagnetic shield S1 is disposed relatively to the magnetic body B such that the third main face M3 faces the second main face M2. That is, the first electromagnetic shield S1 is disposed such that the third main face M3 faces the second main face M2. In the example illustrated in FIG. 4, the first electromagnetic shield S1 is brought into contact with the magnetic body B. In addition, the first electromagnetic shield S1 may be configured to be separate from the magnetic body B. In addition, the third main face M3 may be a face that is non-parallel with the second main face M2.

In addition, in the example illustrated in FIG. 4, at least a part of the first electromagnetic shield S1 is surrounded by the second conductor in the opening included in the cancellation coil face. In addition, in this example, in a case in which the coil unit CU is seen in the axial direction of the second axis A2, the outline of the first electromagnetic shield S1 is included inside the outline of the opening included in the cancellation coil face (in other words, the opening included in the cancellation coil CL). Here, there is a gap used for allowing magnetic fluxes generated by the cancellation coil CL to pass through it between a part or the whole of the outer circumference of the first electromagnetic shield S1 in the vicinity of the second axis A2 and the second conductor. In this example, there is a gap between the whole outer circumference and the second conductor.

According to the configuration illustrated in FIG. 4, the coil unit CU can decrease magnetic fluxes extending in a downward direction of the coil unit CU. As a result, distant leakage fluxes on the lower side of the coil unit CU can be decreased with balance.

Figure 5:
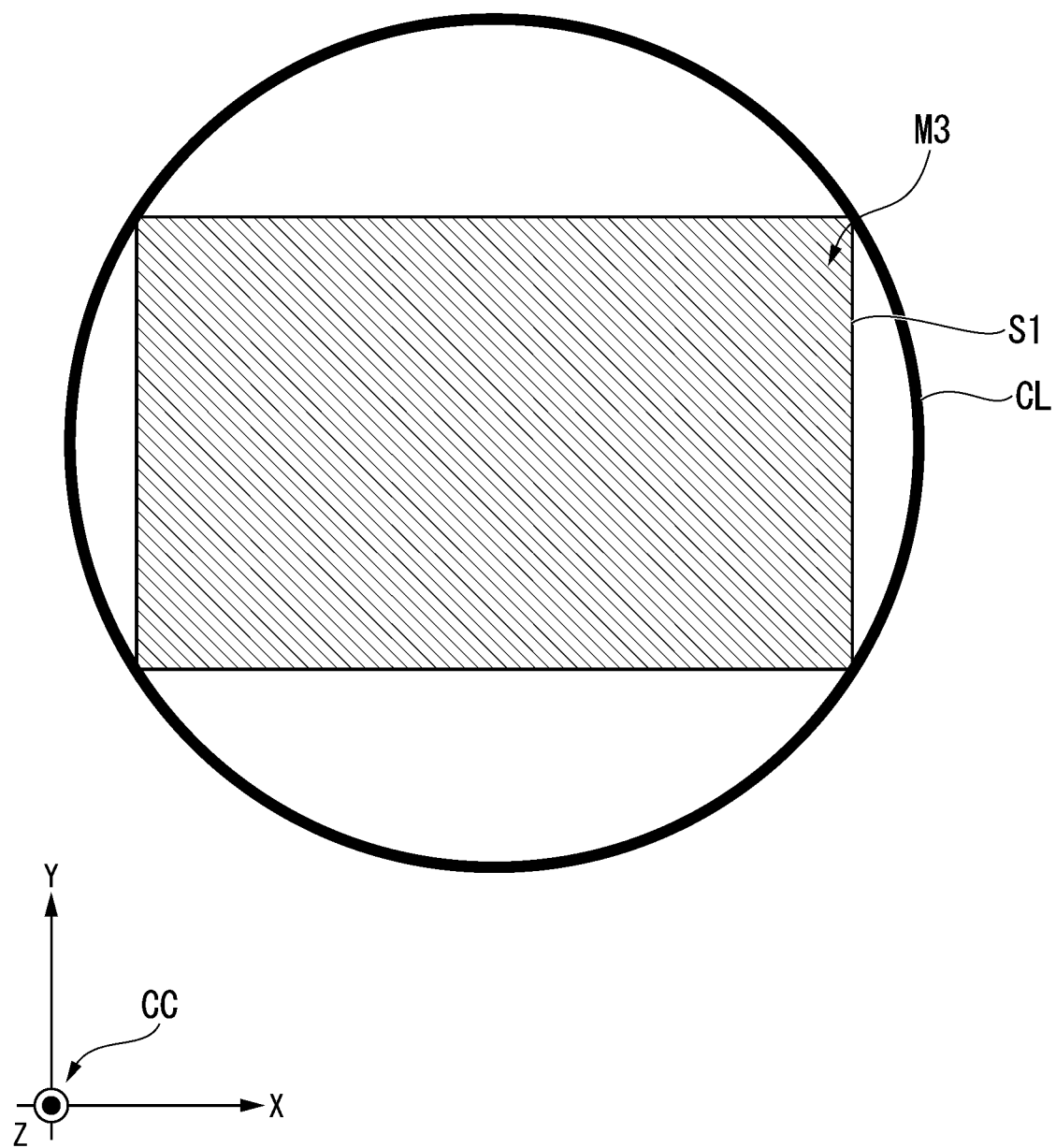
FIG. 5 is a diagram illustrating one example of a positional relation between the cancellation coil CL and the first electromagnetic shield S1 in a case in which there is a gap between a part of an outer circumference of the first electromagnetic shield S1 in the vicinity of a second axis A2 and a second conductor.

Here, FIG. 5 is a diagram illustrating one example of a positional relation between a cancellation coil CL and a first electromagnetic shield S1 in a case in which there is a gap between a part of an outer circumference of the first electromagnetic shield S1 in the vicinity of the second axis A2 and the second conductor. More specifically, FIG. 5 is a diagram illustrating one example of the positional relation in a case in which the cancellation coil CL and the first electromagnetic shield S1 are seen toward the negative direction of the Z axis. The cancellation coil CL illustrated in FIG. 5 is a coil having a shape different from that of the cancellation coil CL illustrated in FIG. 4 and is a coil having a circular shape. For this reason, in FIG. 5, for simplification of the drawing, the cancellation coil CL is denoted by a circle. In the example illustrated in FIG. 5, the outline of an opening included in the cancellation coil CL becomes a circumscribed circle of the outline of the first electromagnetic shield S1. In other words, the example illustrated in FIG. 5 is one example of a case in which there is a gap between a part of an outer circumference of the first electromagnetic shield S1 in the vicinity of the second axis A2 and the second conductor. Also in such a case, the coil unit CU including the first electromagnetic shield S1 can inhibit a decrease in the transmission efficiency of electric power through wireless power transmission while decreasing leakage fluxes. Furthermore, the coil unit CU can decrease magnetic fluxes extending in the downward direction of the coil unit CU. As a result, the coil unit CU can decrease distant leakage fluxes of the coil unit CU with balance.

Figure 6:
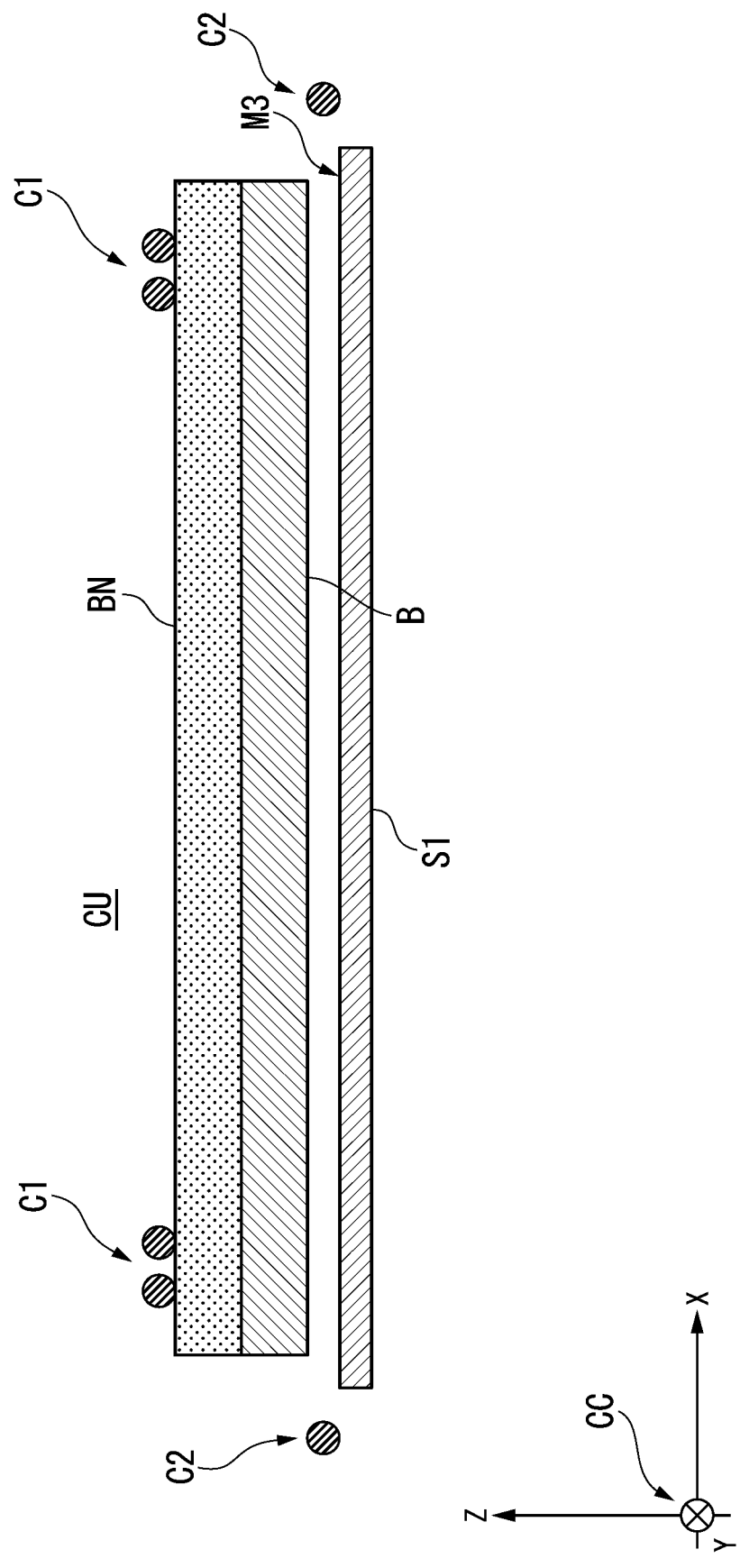
FIG. 6 is a diagram illustrating another example of the configuration of a coil unit CU including a first electromagnetic shield S1.

In addition, the coil unit CU, as illustrated in FIG. 6, may be configured to include a first electromagnetic shield S1. FIG. 6 is a diagram illustrating another example of the configuration of a coil unit CU including a first electromagnetic shield S1.

In the example illustrated in FIG. 6, the first electromagnetic shield S1 is disposed relatively to the magnetic body B such that a third main face M3 faces a second main face M2. That is, in the example illustrated in FIG. 6, the first electromagnetic shield S1 is disposed such that a third main face M3 faces a second main face M2. In this example, a cancellation coil CL is positioned between the first electromagnetic shield S1 and the second main face M2. In this example, in a case in which the coil unit CU is seen in the axial direction of the second axis A2, the outline of the first electromagnetic shield S1 is included inside the outline of an opening included in the cancellation coil face.

According to the configuration illustrated in FIG. 6, the coil unit CU can inhibit a decrease in the transmission efficiency of electric power through wireless power transmission while decreasing leakage fluxes. Furthermore, the coil unit CU can decrease magnetic flux extending in the downward direction of the coil unit CU. As a result, the coil unit CU can decrease distant leakage fluxes of the coil unit CU with balance. In addition, according to this configuration, the coil unit CU can inhibit a decrease in magnetic fluxes passing through a path orbiting a distance part in an upward direction of the coil unit CU among magnetic fluxes generated by the cancellation coil CL, and distant leakage fluxes of the coil unit CU can be decreased with higher balance.

Figure 7:
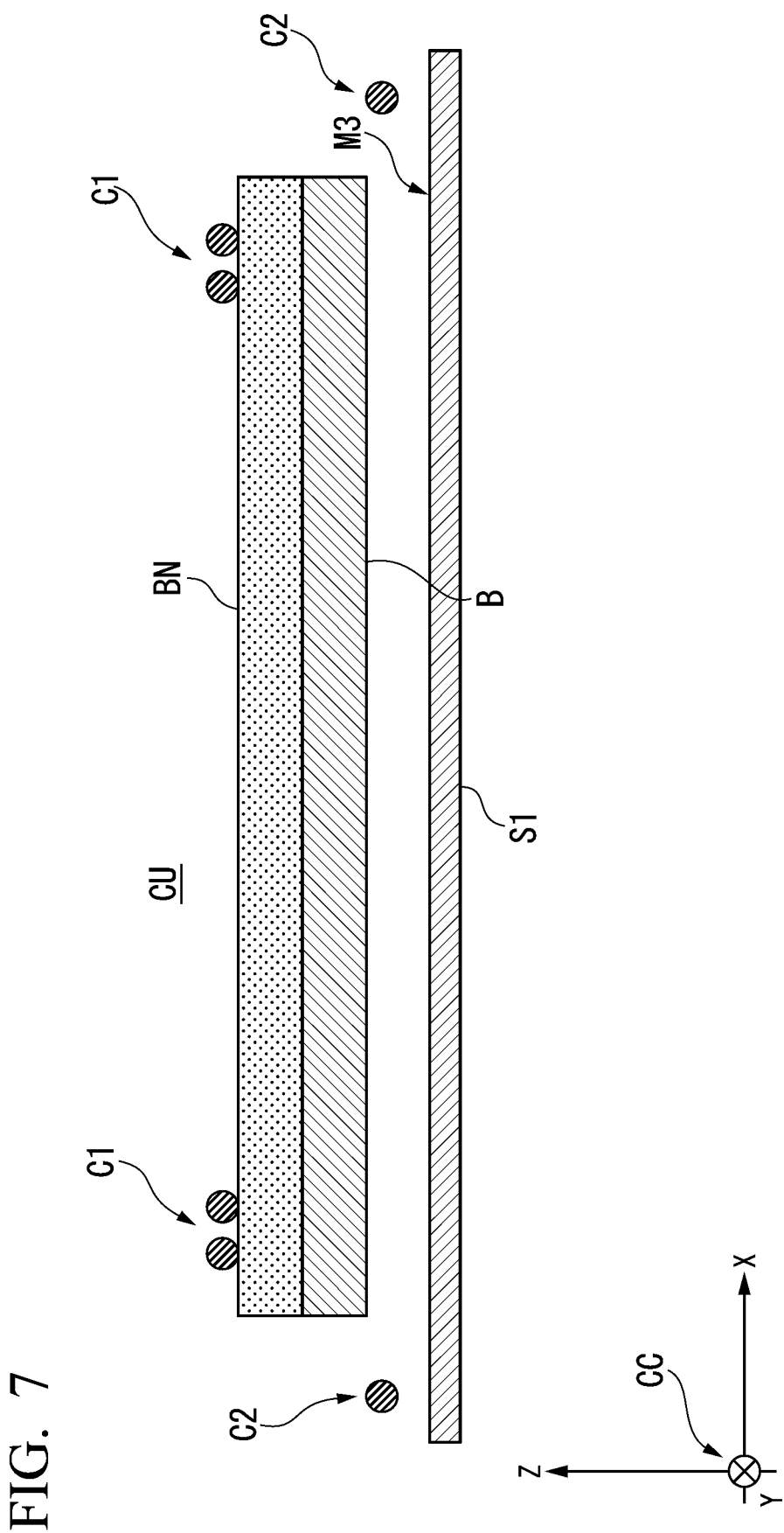
FIG. 7 is a diagram illustrating yet another example of the configuration of a coil unit CU including a first electromagnetic shield S1.

In addition, the coil unit CU, as illustrated in FIG. 7, may be configured to include a first electromagnetic shield S1. FIG. 7 is a diagram illustrating yet another example of the configuration of a coil unit CU including a first electromagnetic shield S1.

In the example illustrated in FIG. 7, the first electromagnetic shield S1 is disposed relatively to a magnetic body B such that a third main face M3 faces a second main face M2. That is, in the example illustrated in FIG. 7, the first electromagnetic shield S1 is disposed such that a third main face M3 faces a second main face M2. In this example, a cancellation coil CL is positioned between the first electromagnetic shield S1 and the second main face M2. In this example, in a case in which the coil unit CU is seen in an axial direction of a second axis A2, the first electromagnetic shield S1 has a part positioned outside the outline of the cancellation coil CL. In this example, in this case, the whole outline of the cancellation coil CL is included inside the contour of the first electromagnetic shield S1. In addition, in FIG. 7, there is a gap between the cancellation coil CL and the first electromagnetic shield S1. In a case in which the cancellation coil CL is not an insulation-coated conductor, as illustrated in FIG. 7, a gap needs to be arranged between the cancellation coil CL and the first electromagnetic shield S1. On the other hand, in a case in which the cancellation coil CL is an insulation-coated conductor, a gap may not be arranged between the cancellation coil CL and the first electromagnetic shield S1.

According to the configuration illustrated in FIG. 7, the coil unit CU can reliably decrease magnetic fluxes extending in the downward direction of the coil unit CU. As a result, the coil unit CU can decrease distant leakage fluxes of the coil unit CU with balance more reliably.

Figure 8:
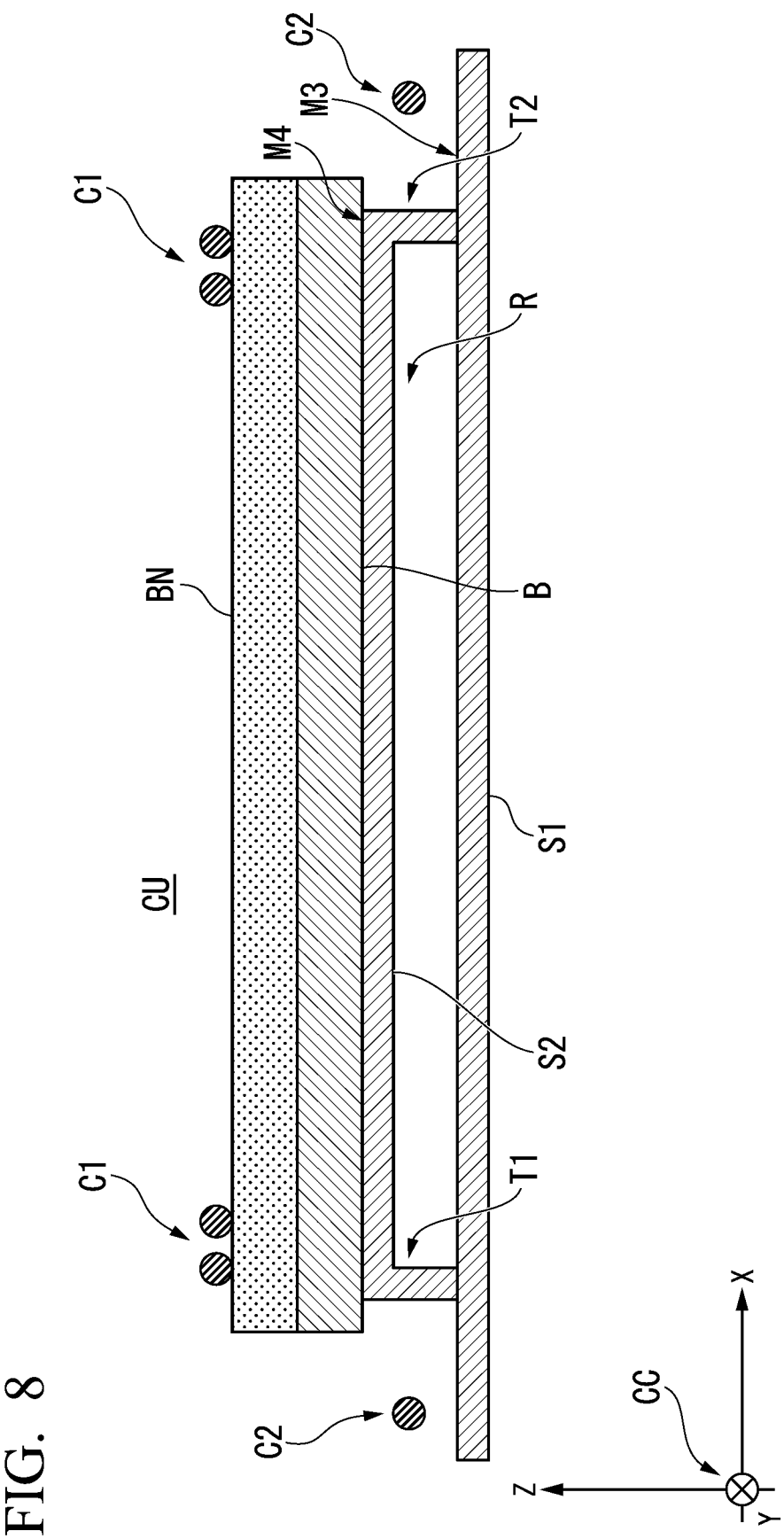
FIG. 8 is a diagram illustrating one example of the configuration of a coil unit CU including a first electromagnetic shield S1 and a second electromagnetic shield S2.

In addition, the coil unit CU, as illustrated in FIG. 8, may be configured to include a first electromagnetic shield S1 and a second electromagnetic shield S2. FIG. 8 is a diagram illustrating one example of the configuration of a coil unit CU including a first electromagnetic shield S1 and a second electromagnetic shield S2.

The second electromagnetic shield S2 is a member that shields electromagnetism. The second electromagnetic shield S2, for example, is formed of aluminum. In addition, the second electromagnetic shield S2 may be formed of another material that can shield electromagnetism instead of aluminum.

The second electromagnetic shield S2, as illustrated in FIG. 8, includes a fourth main face M4. In the example illustrated in FIG. 8, the fourth main face M4 is a face that is parallel to a second main face M2. In addition, the second electromagnetic shield S2 is disposed relatively to a magnetic body B such that the fourth main face M4 faces the second main face M2. That is, the second electromagnetic shield S2 is disposed such that the fourth main face M4 faces the second main face M2. In the example illustrated in FIG. 8, the second electromagnetic shield S2 is brought into contact with the magnetic body B. In addition, the second electromagnetic shield S2 may be configured to be separate from the magnetic body B. In addition, the fourth main face M4 may be a face that is non-parallel with the second main face M2.

In addition, the second electromagnetic shield S2 includes protrusion parts protruding from both end parts in a first direction orthogonal to the second axis A2 in a second direction from the second main face M2 to the cancellation coil CL in an axial direction of the second axis A2. In the example illustrated in FIG. 8, the first direction is an axial direction of the X axis. In addition, the first direction may be a direction different from the axial direction of the X axis among directions orthogonal to the second axis A2. In this example, the second direction is a negative direction of the Z axis. In FIG. 8, a protrusion part on the negative-direction side of the X axis among the protrusions included in the second electromagnetic shield S2 is denoted by a protrusion part T1. In addition, a protrusion part on the positive-direction side of the X axis among the protrusion parts included in the second electromagnetic shield S2 is denoted by a protrusion part T2 in FIG. 8.

The protrusion part T1 and the protrusion part T2 may be parts of the second electromagnetic shield S2 or may be members that are separate from the second electromagnetic shield S2. However, in a case in which the protrusion part T1 and the protrusion part T2 are members separate from the second electromagnetic shield S2, electromagnetic shields other than the first electromagnetic shield S1 and the second electromagnetic shield S2 are included in the protrusion part T1 and the protrusion part T2.

In addition, as illustrated in FIG. 8, at least a part of the protrusion part T1 and at least a part of the protrusion part T2 are disposed inside an area surrounded by a second conductor. The first electromagnetic shield S1 is provided at a tip end of each of the protrusion part T1 and the protrusion part T2. The configuration of the first electromagnetic shield S1 disposed at the tip end has the same configuration as the configuration of the first electromagnetic shield S1 illustrated in FIG. 7. In accordance with this, a space R surrounded by the first electromagnetic shield S1 and the second electromagnetic shield S2 is formed in the coil unit CU. Since the space R is surrounded by the first electromagnetic shield S1 and the second electromagnetic shield S2, magnetic fluxes generated by the transmission coil L and the cancellation coil CL hardly enters the inside of the space R. For this reason, a certain circuit may be disposed inside the space R. In other words, in the coil unit CU, a circuit can be disposed inside the space that normally becomes a dead space in which any circuit cannot be disposed, both implementation of multiple functions of the coil unit CU and a decrease in the size of the coil unit CU can be achieved. In addition, by including the first electromagnetic shield S1 and the second electromagnetic shield S2 in the coil unit CU, the coil unit CU can inhibit a decrease in the transmission efficiency of electric power through wireless power transmission while decreasing leakage fluxes. Furthermore, the coil unit CU can decrease magnetic fluxes extending in the downward direction of the coil unit CU. As a result, the coil unit CU can decrease distant leakage fluxes of the coil unit CU with balance. In addition, in the coil unit CU illustrated in FIG. 8, a gap is arranged between the cancellation coil CL and the first electromagnetic shield S1. However, this coil unit CU may be configured to have no gap between the cancellation coil CL and the first electromagnetic shield S1.

Here, it is preferable that the number of times of winding of the second conductor in the cancellation coil CL described above is smaller than the number of times of winding of the first conductor in the transmission coil L.

For example, in the coil unit CU illustrated in FIG. 6, it is preferable that the number of times of winding the second conductor in the cancellation coil CL is equal to or smaller than ⅓ of the number of times of winding the first conductor in the transmission coil L. In accordance with this, this coil unit CU can inhibit a decrease in the transmission efficiency of electric power through wireless power transmission more reliably while decreasing leakage fluxes. In addition, in this coil unit CU, since the length of the second conductor becomes short, at least one of inhibition of heat generation of the coil unit CU, inhibition of a manufacturing cost of the coil unit CU, and a decrease in the size of the coil unit CU can be realized.

In addition, for example, in the coil unit CU illustrated in FIG. 7, it is preferable that the number of times of winding the second conductor in the cancellation coil CL is equal to or smaller than ½ of the number of times of winding the first conductor in the transmission coil L (more preferably, equal to or smaller than 3/10 of the number of times). In accordance with this, the coil unit CU can inhibit a decrease in the transmission efficiency of electric power through wireless power transmission more reliably while decreasing leakage fluxes. In addition, in this coil unit CU, since the length of the second conductor becomes short, at least one of inhibition of heat generation of the coil unit CU, inhibition of a manufacturing cost of the coil unit CU, and a decrease in the size of the coil unit CU can be realized.

In addition, the shape of the transmission coil L described above may be any other shape such as a circular shape, an oval shape, or any other polygonal shape instead of the shape of the transmission coil face being a rectangular shape.

In addition, the shape of the cancellation coil CL described above may be any other shape such as a circular shape, an oval shape, or any other polygonal shape instead of the shape of the cancellation coil face being a rectangular shape.

As described above, a coil unit (in the example described above, the coil unit CU, the power transmission coil unit 131, or the power receiving coil unit 211) according to an embodiment includes: a magnetic body (in the example described above, the magnetic body B) that includes a first main face (in the example described above, the first main face M1) and a second main face (in the example described above, the second main face M2) facing the first main face; a first coil (in the example described above, the transmission coil L, the power transmission coil L1, or the power receiving coil L2) made of a first conductor winding spirally around a first axis (in the example described above, the first axis A1); and a second coil (in the example described above, the cancellation coil CL) made of a second conductor winding spirally around a second axis (in the example described above, the second axis A2) once or more, the first coil has a first coil face (in the example described above, the transmission coil face) intersecting the first axis and is disposed such that the first coil face faces the first main face, the second coil has a second coil face (in the example described above, the cancellation coil face) intersecting the second axis and is disposed such that the second coil face faces the second main face, the first coil face has a first opening, the second coil face has second opening, at least a part of an inner edge of the second opening is separated from the magnetic body, and the second coil is configured to generate a magnetic field in a direction opposite to a direction of a magnetic field generated by the first coil. Accordingly, the coil unit can inhibit a decrease in the transmission efficiency of electric power through wireless power transmission while decreasing leakage fluxes.

In addition, a configuration in which the coil unit further includes a first electromagnetic shield (in the example described above, the first electromagnetic shield S1) that has a third main face (in the example described above, the third main face M3) and is disposed such that the third main face faces the second main face, at least a part of the first electromagnetic shield is surrounded by the second conductor in the second opening, and, as viewed in an axial direction of the second axis, an outline of the first electromagnetic shield is included inside an outline of the second opening may be used.

In addition, a configuration in which the coil unit further includes a first electromagnetic shield that has a third main face and is disposed such that the third main face faces the second main face, the second coil is positioned between the first electromagnetic shield and the second main face, and as viewed in an axial direction of the second axis, an outline of the first electromagnetic shield is included inside an outline of the second opening may be used.

In addition, a configuration in which the coil unit further includes a first electromagnetic shield that has a third main face and is disposed such that the third main face faces the second main face, the second coil is positioned between the first electromagnetic shield and the second main face, and as viewed in an axial direction of the second axis, the first electromagnetic shield has a part positioned outside an outline of the second coil may be used.

In addition, a configuration in which the coil unit further includes a second electromagnetic shield (in the example described above, the second electromagnetic shield S2) that has a fourth main face (in the example described above, the fourth main face M4) and is disposed such that the fourth main face faces the second main face, the second electromagnetic shield includes protrusion parts (in the example described above, the protrusion part T1 and the protrusion part T2), the protrusion parts are protruding from both end parts in a first direction (in the example described above, the axial direction of the X axis) orthogonal to the second axis to a second direction from the second main face to the second coil of an axial direction of the second axis, the protrusion part include an electromagnetic shield, at least a part of the protrusion part is disposed inside an area surrounded by the second conductor, and the first electromagnetic shield is provided at a tip end of the protrusion part is used.

In addition, in the coil unit, a configuration in which the number of times of winding of the second conductor in the second coil is smaller than the number of times of winding of the first conductor in the first coil may be used.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

1 Wireless power transmission system
10 Wireless power transmission device
11 AC power supply
12 Power transmission circuit
13 Power transmission coil part
14 Transmission-side communication unit
20 Wireless power receiving device
21 Power receiving coil part
22 Power receiving circuit
23 Power receiving-side communication unit
24 Load
121 AC/DC converter
122 Inverter
123 Control circuit
131 Power transmission coil unit
211 Power receiving coil unit
221 Rectification circuit
222 Control comparison unit
A1 First axis
A2 Second axis
B Magnetic body
CL Cancellation coil
CU Coil unit
L Transmission coil
L1 Power transmission coil
L2 Power receiving coil
M1 First main face
M2 Second main face
R Space
S1 First electromagnetic shield
S2 Second electromagnetic shield
T1 Protrusion part
T2 Protrusion part

What is claimed is:

1. A coil unit comprising:
   a magnetic body that includes a first main face and a second main face facing the first main face;
   a first coil made of a first conductor winding spirally around a first axis; and
   a second coil made of a second conductor winding spirally around a second axis once or more,
   wherein the first coil has a first coil face intersecting the first axis and is disposed such that the first coil face faces the first main face,
   the second coil has a second coil face intersecting the second axis and is disposed such that the second coil face faces the second main face,
   the first coil face has a first opening,
   the second coil face has a second opening,
   at least a part of an inner edge of the second opening is separated from the magnetic body, and
   the second coil is configured to generate a magnetic field in a direction opposite to a direction of a magnetic field generated by the first coil.

2. The coil unit according to claim 1, further comprising, a first electromagnetic shield that has a third main face and is disposed such that the third main face faces the second main face,
   wherein at least a part of the first electromagnetic shield is surrounded by the second conductor in the second opening, and
   as viewed in an axial direction of the second axis, an outline of the first electromagnetic shield is included inside an outline of the second opening.

3. The coil unit according to claim 1, further comprising, a first electromagnetic shield that has a third main face and is disposed such that the third main face faces the second main face,
   wherein the second coil is positioned between the first electromagnetic shield and the second main face, and
   as viewed in an axial direction of the second axis, an outline of the first electromagnetic shield is included inside an outline of the second opening.

4. The coil unit according to claim 1, further comprising, a first electromagnetic shield that has a third main face and is disposed such that the third main face faces the second main face,
   wherein the second coil is positioned between the first electromagnetic shield and the second main face, and
   as viewed in an axial direction of the second axis, the first electromagnetic shield has a part positioned outside an outline of the second coil.

5. The coil unit according to claim 3, further comprising, a second electromagnetic shield that has a fourth main face and is disposed such that the fourth main face faces the second main face,
   wherein the second electromagnetic shield includes protrusion parts,
   the protrusion parts are protruding from both end parts in a first direction orthogonal to the second axis to a second direction from the second main face to the second coil of an axial direction of the second axis,
   the protrusion part include an electromagnetic shield,
   at least a part of the protrusion part is disposed inside an area surrounded by the second conductor, and
   the first electromagnetic shield is provided at a tip end of the protrusion part.

6. The coil unit according to claim 4, further comprising, a second electromagnetic shield that has a fourth main face and is disposed such that the fourth main face faces the second main face,
   wherein the second electromagnetic shield includes protrusion parts,
   the protrusion parts are protruding from both end parts in a first direction orthogonal to the second axis to a second direction from the second main face to the second coil of an axial direction of the second axis, the protrusion part include an electromagnetic shield, at least a part of the protrusion part is disposed inside an area surrounded by the second conductor, and the first electromagnetic shield is provided at a tip end of the protrusion part.

7. The coil unit according to claim 1, wherein the number of times of winding of the second conductor in the second coil is smaller than the number of times of winding of the first conductor in the first coil.

8. The coil unit according to claim 2, wherein the number of times of winding of the second conductor in the second coil is smaller than the number of times of winding of the first conductor in the first coil.

9. The coil unit according to claim 3, wherein the number of times of winding of the second conductor in the second coil is smaller than the number of times of winding of the first conductor in the first coil.

10. The coil unit according to claim 4, wherein the number of times of winding of the second conductor in the second coil is smaller than the number of times of winding of the first conductor in the first coil.

11. A wireless power transmission device comprising the coil unit according to claim 1.

12. A wireless power transmission device comprising the coil unit according to claim 2.

13. A wireless power transmission device comprising the coil unit according to claim 3.

14. A wireless power receiving device comprising the coil unit according to claim 1.

15. A wireless power receiving device comprising the coil unit according to claim 2.

16. A wireless power receiving device comprising the coil unit according to claim 3.

17. A wireless power transmission system comprising:

a wireless power transmission device; and a wireless power receiving device, wherein at least one of the wireless power transmission device and the wireless power receiving device includes the coil unit according to claim 1.

18. A wireless power transmission system comprising:

a wireless power transmission device; and a wireless power receiving device, wherein at least one of the wireless power transmission device and the wireless power receiving device includes the coil unit according to claim 2.

19. A wireless power transmission system comprising:

a wireless power transmission device; and a wireless power receiving device, wherein at least one of the wireless power transmission device and the wireless power receiving device includes the coil unit according to claim 3.

* * * * *